United States Patent
Gehring

(10) Patent No.: US 10,791,101 B2
(45) Date of Patent: Sep. 29, 2020

(54) ENCRYPTED AUDIO STREAMING

(71) Applicant: Sonova AG, Staefa (CH)

(72) Inventor: Stephan Gehring, Uerikon (CH)

(73) Assignee: Sonova AG, Staefa (CH)

( * ) Notice: Subject to any disclaimer, the term of this patent is extended or adjusted under 35 U.S.C. 154(b) by 27 days.

(21) Appl. No.: 16/035,837

(22) Filed: Jul. 16, 2018

(65) Prior Publication Data

US 2019/0020636 A1 Jan. 17, 2019

Related U.S. Application Data

(63) Continuation of application No. PCT/EP2017/068013, filed on Jul. 17, 2017.

(51) Int. Cl.
*H04L 29/06* (2006.01)
*H04L 9/08* (2006.01)
(Continued)

(52) U.S. Cl.
CPC .......... *H04L 63/0457* (2013.01); *H04L 9/088* (2013.01); *H04L 9/0833* (2013.01);
(Continued)

(58) Field of Classification Search
CPC . H04L 63/0457; H04L 63/062; H04L 63/065; H04L 63/0435; H04L 63/18;
(Continued)

(56) References Cited

U.S. PATENT DOCUMENTS 8,005,227 B1 * 8/2011 Linnell ................. H04L 9/3236
380/279
10,075,820 B2 * 9/2018 Kumar ................. H04W 12/10
(Continued)

FOREIGN PATENT DOCUMENTS

CN 103581742 A * 2/2014
EP 1804462 A1 7/2007

OTHER PUBLICATIONS

N.J. Thorwirth, et al., Security methods for MP3 music delivery, Oct. 2000, Conference Record of the Thirty-Fourth Asilomar Conference on Signals, Systems and Computers (Cat. No. 00CH37154), pp. 1-5.*

(Continued)

*Primary Examiner* — Farid Homayounmehr
*Assistant Examiner* — Raied A Salman

(57) ABSTRACT

The disclosed technology relates to broadcasting encrypted data to multiple receiver devices, where some receiver devices have long-term access to the encrypted data and some receiver devices have a temporary access to the encrypted data. Receivers having long-term access are part of a "member group" because these member group devices have a master key and the master key enables the member group devices to derive the necessary information to decrypt the encrypted broadcast. In contrast, devices with temporary access possess only a guest key and not master key, without a master key the devices need to receive the guest key from another device to decrypt the broadcast. Access to the encrypted stream can also be based on broadcasting multiple or single diversifiers, where a diversifier can include group identification information to assist in restricting access to the encrypted stream.

17 Claims, 11 Drawing Sheets

(51) Int. Cl.
*H04L 9/14* (2006.01)
*H04N 21/266* (2011.01)
*H04L 9/16* (2006.01)
*H04N 21/81* (2011.01)
*H04W 12/04* (2009.01)
*H04N 21/233* (2011.01)
*H04N 21/2347* (2011.01)
*H04W 4/06* (2009.01)
*H04W 4/80* (2018.01)
*H04W 12/00* (2009.01)

(52) U.S. Cl.
CPC .......... *H04L 9/0861* (2013.01); *H04L 9/0866* (2013.01); *H04L 9/14* (2013.01); *H04L 9/16* (2013.01); *H04L 63/062* (2013.01); *H04L 63/065* (2013.01); *H04N 21/26613* (2013.01); *H04N 21/8106* (2013.01); *H04W 12/04031* (2019.01); *H04L 63/0435* (2013.01); *H04L 63/18* (2013.01); *H04L 2209/601* (2013.01); *H04L 2463/061* (2013.01); *H04N 21/233* (2013.01); *H04N 21/23476* (2013.01); *H04W 4/06* (2013.01); *H04W 4/80* (2018.02); *H04W 12/0052* (2019.01)

(58) Field of Classification Search
CPC ... H04L 9/0833; H04L 9/0861; H04L 9/0866; H04L 9/088; H04L 9/14; H04L 9/16; H04L 2209/601; H04L 2463/061; H04W 12/04031; H04W 12/0052; H04W 4/80; H04W 4/06; H04W 8/005; H04W 4/008; H04W 76/023; H04W 12/06; H04N 21/26613; H04N 21/8106; H04N 21/233; H04N 21/23476
See application file for complete search history.

(56) References Cited

U.S. PATENT DOCUMENTS

| | | | | |
|---|---|---|---|---|
| 10,284,971 B2* | 5/2019 | Secall | ................. | H04R 25/554 |
| 10,306,380 B2* | 5/2019 | Roeck | ................. | H04R 25/552 |
| 10,390,113 B2* | 8/2019 | Kwon | ................. | H04W 8/005 |
| 2006/0062393 A1* | 3/2006 | Hsu | ................. | H04L 9/0891 380/281 |
| 2006/0251256 A1* | 11/2006 | Asokan | ............... | H04W 12/003 380/270 |
| 2007/0267491 A1* | 11/2007 | Muto | ................. | G06Q 20/20 235/383 |
| 2010/0000529 A1 | 1/2010 | Kostianinen et al. | | |
| 2010/0005294 A1* | 1/2010 | Kostiainen | ......... | H04W 12/003 713/168 |
| 2011/0167270 A1* | 7/2011 | Lee | ................. | H04L 9/0869 713/170 |
| 2011/0231659 A1* | 9/2011 | Sinha | ................. | H04L 9/0869 713/168 |
| 2013/0322648 A1* | 12/2013 | Chukka | ................. | H04W 4/80 381/77 |
| 2014/0105394 A1* | 4/2014 | Abildgren | ............ | G06F 21/606 380/255 |
| 2015/0215781 A1* | 7/2015 | Reed | ................. | H04L 63/0464 726/5 |
| 2017/0006460 A1* | 1/2017 | Conn | ................. | H04W 8/005 |
| 2017/0105076 A1* | 4/2017 | Gehring | ............... | H04R 25/305 |
| 2017/0338948 A1* | 11/2017 | Boehl | ................. | H04L 9/0861 |
| 2018/0352312 A1* | 12/2018 | Kwon | ................. | H04W 76/14 |
| 2019/0349762 A1* | 11/2019 | Bang | ................. | H04L 9/0861 |

OTHER PUBLICATIONS

Filippo Gandino, et al., Random key pre-distribution with transitory master key for wireless sensor networks, Co-Next Student Workshop '09: Proceedings of the 5th international student workshop on Emerging networking experiments and technologies, Dec. 2009, pp. 27-28.*

International Search Report and Written Opinion, International Application No. PCT/EP2017/068013; Applicant: Sonova AG; filed Jul. 17, 2017; dated Apr. 16, 2018; 16 pages.

Bluetooth; Supplement to the Bluetooth Core Specification; CSS Version 7; Published Dec. 6, 2016; available at: www.bluetooth.com/specifications.

Bluetooth; Bluetooth Core Secification, v5.0; Published Dec. 6, 2016; available at: www.bluetooth.com/specifications.

* cited by examiner

ENCRYPTED AUDIO STREAMING

CROSS REFERENCE TO RELATED APPLICATION

The present application claims priority to PCT application number PCT/EP2017/068013 titled "Encrypted Audio Streaming," filed on Jul. 17, 2017, which is incorporated herein by reference for its entirety.

TECHNICAL FIELD

The disclosed technology relates to broadcasting encrypted data to multiple receiver devices, where some receiver devices have long-term access to decrypt the encrypted data and some receiver devices have temporary access to decrypt the encrypted data.

BACKGROUND

When a device is broadcasting data, it is sometimes preferred to encrypt the broadcast to prevent unwanted eavesdroppers. Encrypting data prior to broadcasting through an algorithm makes it unreadable to those who do not possess knowledge of a key or encryption algorithm used to encrypt the broadcast. For example, a resident may want to prevent neighbors from eavesdropping a broadcast from a television (TV) streamer connected to a TV located in the resident's house by encrypting the broadcast. One encryption scheme for broadcasting information is symmetric encryption, where the broadcaster and receiver share a secret key to encrypt and decrypt information.

Traditionally, symmetric encryption suffers from a few problems. First, it may be necessary to create a new key for each new broadcast for security purposes because each time a key is in transit, it could be stolen or copied by a third party who would then be able to decrypt any ciphertexts encrypted with that key. Second, the broadcaster may find it difficult to limit the access to encrypted data for one group as compared to another group in a symmetric encryption scheme because the keys are generally identical, which generally means identical privileges. Accordingly, a need exists to address at least one of the above-mentioned problems and provide additional benefits.

SUMMARY

This summary is provided to introduce a selection of concepts in a simplified form that are further described below in the Detailed Description. This summary is not intended to identify key features of the claimed subject matter.

The disclosed technology includes a first method to broadcast encrypted data, the first method comprising: providing a master key to a member receiver device, wherein the master key enables the member receiver device to generate a guest key; generating, at a broadcaster device, a first diversifier; broadcasting the first diversifier, wherein the member receiver device is configured to derive the guest key from the master key and the first diversifier; generating, at the broadcaster device, a second diversifier; broadcasting, from the broadcaster device, the second diversifier, wherein the member receiver device is configured to derive a session key from the guest key and the second diversifier; deriving, at the broadcaster device, the session key based on the guest key and the second diversifier; and broadcasting, from the broadcaster device, an encrypted data stream, wherein the encrypted data stream is encrypted based on the session key.

The first method can include providing the master key with a secure communication, wherein the secure communication includes the broadcaster device and the member receiver device pairing or pairing previously. The broadcast of the encrypted data, the broadcast of the first diversifier, or the second diversifiers can be repeated.

Regarding the guest receiver device, the guest receiver device can perform a method related to the first method comprising: receiving the guest key from the broadcaster device or the member receiver device; receiving the second diversifier; deriving the session key from the guest key and the second diversifier; and decrypting the encrypted data stream based on the session key.

Regarding the member receiver devices, the member receiver device can perform a method related to the first method comprising: receiving the first diversifier; deriving the guest key based on the master key and the first diversifier; receiving the second diversifier; deriving the session key based on the guest key and the second diversifier; and decrypting the encrypted data stream based on the session key.

The disclosed technology includes second method comprising: providing a master key to a member receiver device, generating a single diversifier; broadcasting the single diversifier, wherein the single diversifier enables a device to derive a guest key and a session key; deriving the guest key from the master key and the single diversifier; deriving a session key from the guest key and the single diversifier, wherein the guest key is derived from the master key and the single diversifier; and broadcasting an encrypted data stream, wherein the encrypted data stream is encrypted based on the session key. The broadcaster device can perform the providing of the master key, and wherein a manufacturer of the broadcaster device installed the master key on the broadcaster device or wherein the broadcaster device is configured to generate the master key. The encrypted data stream can be an audio stream.

In some implementations, the single diversifier is a first single diversifier and the second method can also include generating a second single diversifier; broadcasting the second single diversifier; deriving a second guest key based on the master key and the second single diversifier; deriving a second session key based on the second guest key and the second single diversifier; and broadcasting the encrypted data stream, wherein the encrypted data stream is based on the second session key.

In some implementations, the group identification is a first group identification, wherein the single diversifier is a first single diversifier, and the method further comprises: generating, at the broadcaster device, a second group identification; generating, at the broadcaster device, a second modified single diversifier based on the second group identification; and broadcasting the second modified single diversifier. In some implementations, the broadcasting two broadcasts can occur simultaneously, where one broadcast is associated with the first modified single diversifier and the other broadcast is associated with the second modified single diversifier. The broadcaster device is also configured to control the different broadcasts based different group identifications.

Regarding the member receiver device, the member receiver device can perform a method related to the second method comprising: receiving the single diversifier; deriving the guest key based on the master key and the single diversifier; deriving the session key based on the guest key and the single diversifier; and decrypting the encrypted data stream based on the session key. The member receiver device can be a hearing device or a computer.

Regarding the guest receiver device, the guest receiver device can perform a method related to the second method comprising: receiving the guest key from the member receiver device or the broadcaster device; receiving the single diversifier; deriving the session key based on the guest key and the single diversifier; and decrypting the encrypted data stream based on the session key. The guest receiver device can be a hearing device or a mobile device.

In some implementations, the disclosed technology includes a non-transitory computer-readable medium storing instructions, that when executed by a processor, cause a device to perform operations, the operations comprising the first method, the second method, a combination of the first and second method, or a variation of the first or second method.

The disclosed technology also includes a hearing device configured to receive a master key, a guest key, a first diversifier, a second diversifier, a single diversifier, or a modified diversifier with group identification. The hearing device can also be configured to derive a guest key, derive a session key, and decrypt an encrypted data stream.

Figure 1A:
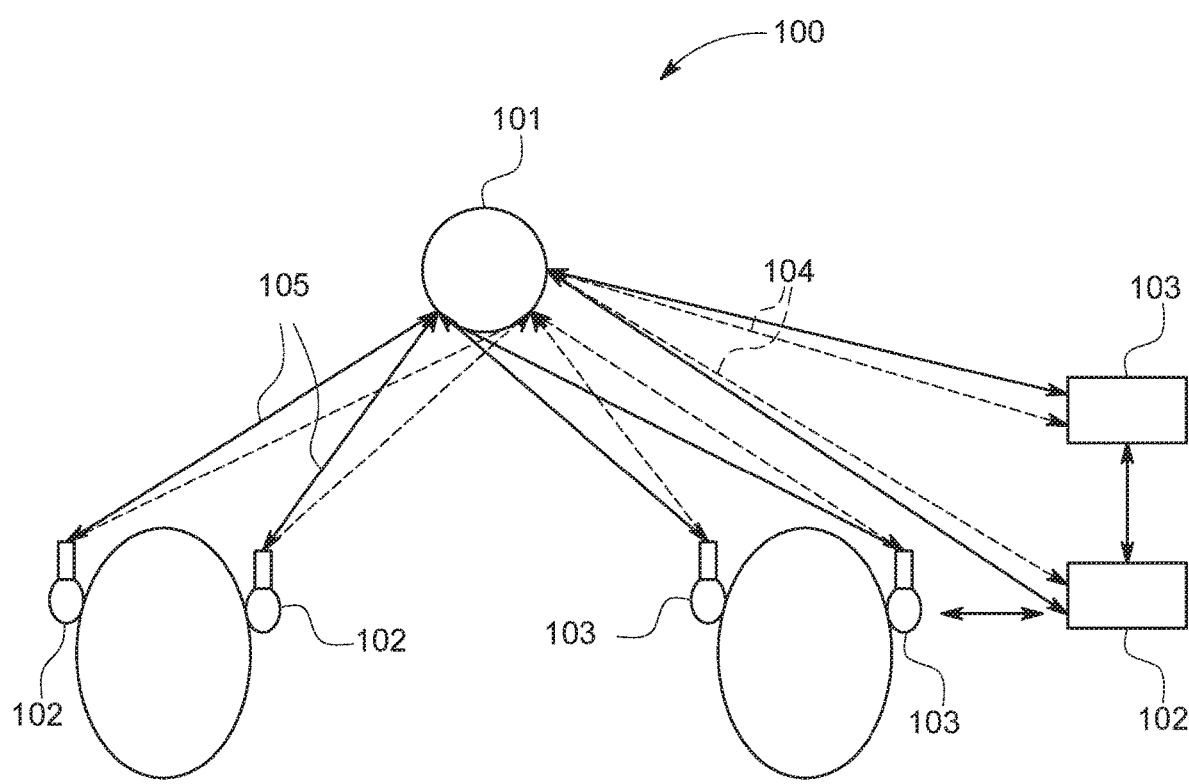
FIG. 1A is a schematic illustration of a wireless communication environment in accordance with some implementations of the disclosed technology.

The drawings are not drawn to scale. Similarly, some components or operations may be separated into different blocks or combined into a single block for the purposes of discussion of some of the implementations of the disclosure.

DETAILED DESCRIPTION

The disclosed technology relates to broadcasting a single encrypted data stream to multiple receivers, where some receivers have long-term access to the encrypted data and other receivers have temporary access to the encrypted data. Even though some receivers have long-term access and some receivers have temporary access, both receivers can be configured to decrypt the single encrypted data stream.

To decrypt a data stream, receivers with long-term and temporary access use a session key; however, receivers derive session keys in different ways. Receivers having long-term access belong to a "member group" because these receivers have a master key and the master key enables the receivers in the member group to generate a guest key from the master key, and then the receiver can generate a session key from the guest key. Devices that possess the master key are referred to as "member receiver devices" or "member group devices". A master key can be a symmetrical key, which is generally a secret shared between devices.

In contrast to member receiver devices that possess the master key, receiver devices with temporary access belong to a "guest group" because these receiver devices only possess guest keys and no master key. Devices in the guest group are referred to as "guest receiver devices" or "guest group devices". A guest receiver device has temporary access because its access to encrypted data is permitted so long as its guest key is valid.

A guest receiver device can receive a guest key in two ways: a broadcaster device can provide a guest key to a guest receiver device or a member receiver device can provide a guest key to the guest receiver device. More generally, a device from the member group can share the guest key with a device from the guest group so that the guest receiver device can use the guest key to derive other keys to decrypt encrypted data (e.g., a session key). See FIG. 1B for more detail regarding member group, guest group, member receiver devices, and guest receiver devices (member receiver devices and guest receiver devices can be collectively referred to as "receivers" because both of these devices are configured to receive information, but the member receiver devices and the guest receiver devices differ in master key access as described throughout the Detailed Description).

Generally, a broadcaster device broadcasts information in sessions, where each session is encrypted using a session key. To derive a session key, the member receiver devices and the guest receiver devices can use diversifiers. In some implementations, the broadcaster device broadcasts two diversifiers used for session key derivation. The broadcaster device can broadcast a first diversifier that is a guest key diversifier, which is a number that a member receiver device can use with a master key to derive a guest key. The broadcaster device can also broadcast a second diversifier that is a session key diversifier, which is a number that a receiver can use with the guest key to derive a session key. Accordingly, the member receiver devices can derive a guest key based on the guest key diversifier and the master key and then derive a session key based on the guest key and session diversifier. However, the guest receiver devices cannot derive the guest key without access to the master key, so the guest receiver devices are restricted in accessing a session unless the broadcaster device or a member receiver device provides the guest key to the guest receiver device.

In contrast to broadcasting a first and second diversifier, the broadcaster device can broadcast a single diversifier. The single diversifier can be a single string for both guest key generation and session key generation (e.g., a 128-bit string). The member receiver device can use the single diversifier to generate a guest key and a session key, and the guest receiver device can use the single diversifier to generate the session key assuming it receives a guest key from a member device. In some implementations, broadcasting a single diversifier can reduce bandwidth usage as compared to broadcasting multiple diversifiers.

The broadcaster device can also combine a group identification (ID) with the single diversifier to form a modified diversifier (also referred to as "an appended", "structured", "concatenated", or "modified single" diversifier). The group ID can be combined with the diversifier to form a modified diversifier such that the first few bits (e.g., 4 bits) of the single diversifier are the group ID and remaining bits of the modified diversifier are the diversifier (e.g., 124 bits). The broadcaster device can change the group ID associated with a broadcast, e.g., which can change the access to the broadcast. Because the modified diversifier includes a group ID, the broadcaster device can control access of the encrypted data such that some groups have access and other groups do not have access. Also, the broadcaster device can broadcast diversifiers and encrypted data to two separate groups simultaneously based on each group having a different diversifier due to a different group ID.

The broadcaster device can provide or broadcast information using a secure communication. A secure communication means that the communication prevents unauthorized interceptors from accessing information in the communication. For example, a secure communication is established using previously exchanged information, such as an agreed-upon encryption key. This previously exchanged information can happen during a pairing process. A secure communication can also include email, Short Message Service (SMS), hand-delivery of a message, or providing information to a person in a manner such that it prevents interception of the message. In contrast, a non-secure communication means that the communication was sent without a security measure in place such that anyone can receive or listen to the communication. For example, a non-secure communication is broadcasting information using a radio, unsecure Wi-Fi™, or unsecure Bluetooth™. The broadcaster device can broadcast a first diversifier, a second diversifier, a single diversifier, or a modifier diversifier including a group identification using a non-secure method of communication.

The disclosed technology can include broadcasting or providing information out-of-band (OOB) or in-band. In some implementations, a broadcaster device provides the master key to a member group device using an OOB communication method, where an OOB communication method is a communication other than a normal of method communication. For example, communicating a master key with Wi-Fi, email, or text, when the normal communication method between the broadcaster and the receiver device is Bluetooth™. As another example, OOB communication can include using near-field communication or displaying the key on the broadcaster device (e.g., TV screen) such that a user can view it and type it into the receiver device. Alternatively, the broadcaster device can transmit or broadcast information using an in-band communication, wherein in-band communication indicates a common or normal communication channel. The broadcaster device can broadcast the first diversifier, second diversifier, single diversifier, and modified diversifier using in-band communication.

As an example of the disclosed technology, a TV streamer can broadcast an audio stream to two hearing devices and a mobile device, which are member receiver devices, and a pair of headphones, which is a guest receiver device. Prior to broadcasting, the TV streamer could have provided a master key to the two hearing devices and the mobile device using an OOB communication or a secured communication. The TV streamer can broadcast a first diversifier. When the hearing devices or the mobile device receive the first diversifier, these devices can derive a guest key from the master key and the first diversifier. The broadcaster device, the hearing devices, or the mobile device can share the guest key with the pair of headphones. The TV streamer can broadcast a second diversifier, which is a session key diversifier. When the hearing devices, the mobile device, and the pair of headphones receive the second diversifier, the devices can derive a session key, where deriving the session key is based on the guest key and the second diversifier. If the broadcaster device encrypts the audio stream with the session key, the hearing devices, the mobile device, and the pair of headphones can decrypt the audio stream based on the session key.

The disclosed technology provides a technical solution to at least one technical problem in broadcasting encrypted data. The disclosed technology provides a single encrypted data stream that can be broadcast to all long-term access devices and temporary access devices. Also, the broadcaster can grant or revoke access to the broadcast such that it does not interfere with the stream access by the member group. The broadcaster device can be configured to broadcast the diversifiers repeatedly or a regular basis (e.g., periodically) so that a receiver has multiple opportunities to receive a diversifier, which is helpful because a receiver may not be able to provide feedback to a broadcaster during a broadcast, e.g., to trigger a rebroadcast of the diversifier. Also, the broadcaster device or a member receiver device can add a receiver device to a member group at any time, e.g., by sharing the master key OOB or using a secure communication to provide the master key, which provides flexibility without reducing security.

The disclosed technology also improves the computer environment by providing security for encrypted communications, reducing bandwidth usage by reducing key or diversifier transmission, and by reducing traffic collisions in a broadcast because the receivers are not required to provide acknowledgement or request repeated information. The disclosed technology also improves the hearing device because it enables encrypted communication while consuming less battery power compared to standard hearing devices that may require bi-directional communication and more power for transmission as compared to only receiving information at the hearing device.

Figure 1B:
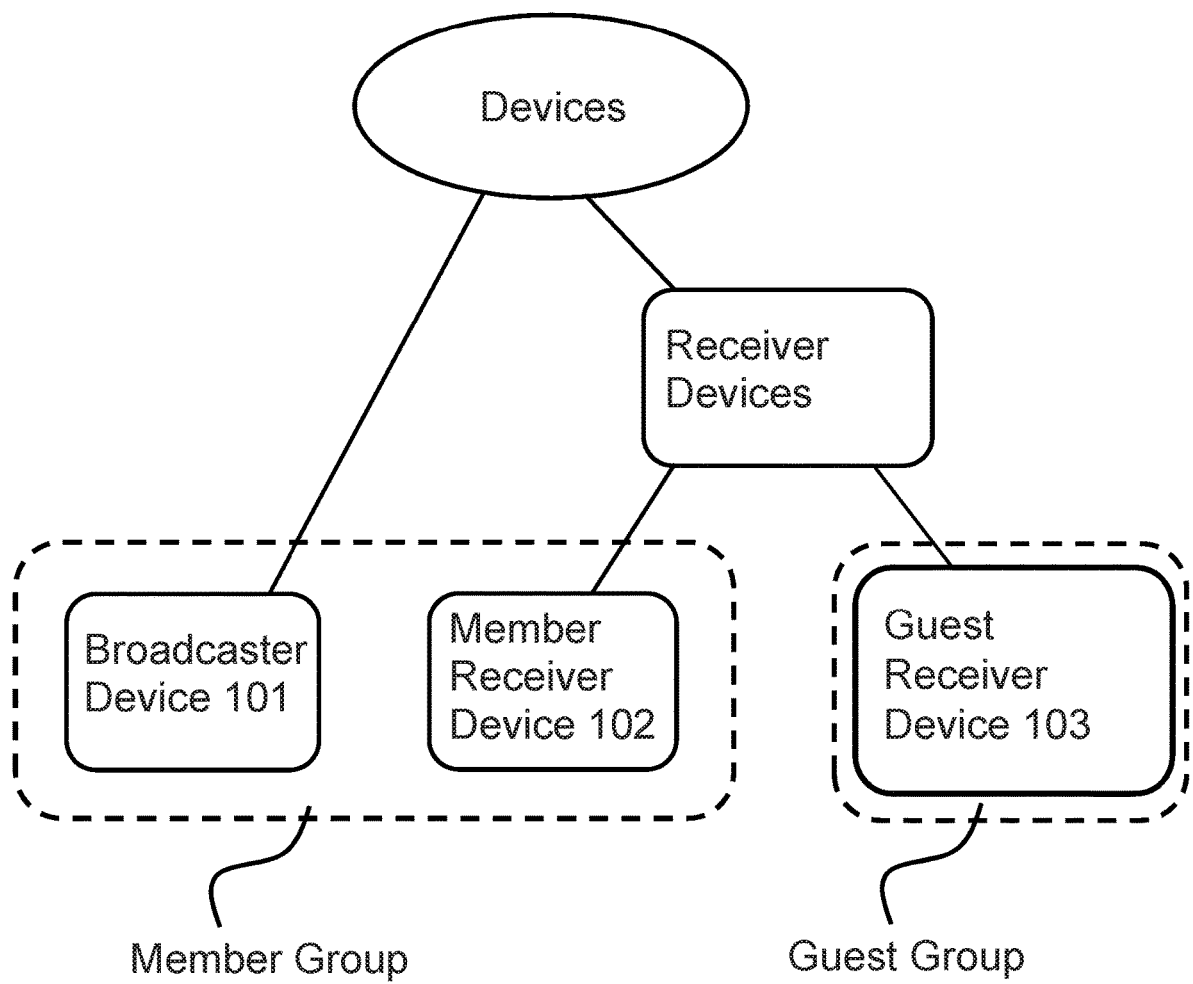
FIG. 1B is a schematic illustration that provides more detail regarding the broadcaster device, the member receiver device, and the guest receiver device from FIG. 1A in accordance with some implementations of the disclosed technology.

FIG. 1A is a schematic illustration of a wireless communication environment 100. The wireless communication environment 100 has a broadcaster device 101, member receiver devices 102 (a "member receiver device 102" in the singular), and guest receiver devices 103 (a "guest receiver device 103" in the singular). See FIG. 2A for more detail regarding the difference between the member receiver device 102 and the guest receiver device 103.

The broadcaster device 101 can provide or broadcast access information 104 and data 105 (e.g., a data stream, an audio stream). Although a single broadcaster device 101 is shown in FIG. 1A, the wireless communication environment 100 can include multiple broadcaster devices 101.

The access information 104 is information that the member receiver devices 102 and the guest receiver devices 103 can use to access the data 105 (e.g., an encrypted data). The access information 104 can include a key, diversifier, a single diversifier, guest key diversifier, session key diversifier, group ID, a combination of group ID and diversifier, or other data for decryption or access purposes. The access information 104 can also include other information related to encrypted such as a nonce. A nonce is an initialization vector used in the Bluetooth™ standard and it can also comprise broadcast information such as a packet counter or advertising information for the broadcast. The nonces can be 16-byte numbers in length used to confirm values generated during a hashing procedure or computation. More information regarding nonces can be found in *the Bluetooth Core Specification, Version* 5.0, publication Date Dec. 6, 2016, *the*

*Core Specification Supplement, Version* 7, publication Date Dec. 6, 2016, both of which are incorporated herein by reference for their entireties.

The data 105 is encrypted information such as an encrypted data, an encrypted audio stream, encrypted video data, or encrypted audio and video data. The broadcaster device 101 can broadcast encrypted audio data to the receiver devices 102 and the guest receiver device 103.

The broadcaster device 101 is configured to broadcast, provide, or transmit information. Broadcasting includes unidirectionally broadcasting information from the broadcaster device 101 to a single or multiple devices. In broadcasting, the receivers do not provide feedback to the broadcaster device as to whether the broadcast information was received (e.g., no uplink, no feedback, or no acknowledgement of receipt). Rather, the broadcast is one-way in that the broadcaster only transmits information and the receiver only receives information. Also, the broadcast may be done repetitively for redundancy as there is no backchannel to enable receiver devices or guest devices to join a stream at any time because receivers only need to wait for a repetition of data and diversifiers to join a stream.

The broadcaster device 101 can also transmit information to the member receiver devices 102 or the guest receiver devices 103. For example, the broadcaster device 101 can pair with the member receiver device 102 or pair with the guest receiver device 103 and transmit a key to these devices. Pairing is a first step in connecting two devices, where pairing establishes permission that the two devices can communicate with each other. In some implementations, pairing can include entering a PIN, code, or receiving a user's approval to pair two devices. After pairing, two devices can be connected securely.

The broadcaster device 101 can be an electronic device. In some implementations, the broadcaster device 101 is a TV streamer, a wireless microphone, a mobile device (e.g., smartphone or tablet), a media device, a radio, a public service announcement system, an advertising system, virtual or augmented reality device, a computer, or other electronic device configured to broadcast information.

The broadcaster device 101 can be configured to broadcast information using a wireless communication protocol such as an Institute of Electrical and Electronics Engineers (IEEE) 802.11 standard, Wi-Fi™, Bluetooth™ (e.g., Bluetooth Classic, Bluetooth Low Energy), ZigBee™, a proprietary protocol, or other related protocol. The broadcaster device 101 can also broadcast information using a radio or a nearfield communication technology. Although the broadcaster device 101 broadcasts or transmits information wirelessly as shown in FIG. 1A, in some implementations, it can broadcast or transmit information using a wired connection. The broadcaster device 101 is described in more detail in FIG. 2A.

The member receiver device 102 and the guest receiver device 103 are electronic devices. An electronic device can be a computing device configured to wirelessly receive information such as a computer, mobile device, media device, headphones, hearing device, or wearable device. As shown in FIG. 1A, the member receiver device 102 and the guest receiver device 103 can be a hearing device, where a hearing device provides audio to a user wearing the hearing device. A hearing device can include a processor, a memory storing instructions (e.g., instructions to carry out processes 300a, 300b, or 300c in FIGS. 3A-3B), a microphone, a loudspeaker, a user input (e.g., a button), a housing or casing, transmitter, an antenna, or a battery (e.g., rechargeable battery).

Some example hearing devices include a hearing aid, headphones, earphones, assisted listening devices, or any combination thereof; and hearing devices include both prescription devices and non-prescription devices configured to be worn on a human head. A hearing device can also include a cochlear implant, where the cochlear implant has an implant component that is implanted into a person and a device component that communicates with the implant component. A hearing aid is a device that provides amplification or attenuation of audio signals to compensate for hearing loss or attenuation functionalities; some example hearing aids include a Behind-the-Ear (BTE), Receiver-in-the-Canal RIC, In-the-Ear (ITE), Completely-in-the-Canal (CIC), or Invisible-in-the-Canal (IIC) hearing aids.

As explained in more detail in FIGS. 2, 3A-3C, 4A-C, and 5, the guest receiver device 103 may not have access to a master key whereas the broadcaster device 101 and the member receiver devices 102 (collectively the member group devices) have access to or possess the master key. Because the guest receiver device 103 does not have access to a master key, it cannot generate a guest key, and without a guest key, it cannot access a stream because a guest key is necessary to derive a session key to decrypt a data stream. This sharing scheme can enable member group devices to have permanent access because they can always use the master key to derive a guest key, whereas the guest receiver devices 103 have temporary or short-term access because the guest key can be revoked or changed (e.g., based on a changed diversifier).

The member receiver devices 102 are configured to generate a guest key from a master key, and use the guest key to derive a session key. However, the member receiver devices 102 do not need to always store the guest key or the session key; rather, the member receiver devices 102 only need to store the master key and can use that to derive other keys (e.g., guest and session key).

FIG. 2 is a block diagram illustration of the broadcaster device 101 and the member receiver device 102 from the wireless communication environment 100 in FIG. 1A. The broadcaster device 101 and the member receiver device 102 include a memory 205, software 210, and a processor 215. The memory 205 stores instructions for executing software 210 comprised of one or more modules and data utilized by the modules. The modules perform methods or functions of the broadcaster device 101 or the member receiver devices 102 described herein, and can include components, subcomponents, or other logical entities that assist with or enable the performance of some these methods or functions. For example, the modules can store algorithms that can be executed by the module to carry out an operation to generate a key, generate a random number, perform a hashing operation, derive a key, or encrypt/decrypt information.

The processor 215 is special-purpose hardware such as application specific integration circuits (ASICS), programmable logic devices (PLDs), field programmable gate arrays (FPGAs), programmable circuitry (e.g., one or more microprocessors microcontrollers), Digital Signal Processor (DSP), appropriately programmed with software or computer code, or a combination of special purpose hardware and programmable circuitry. The broadcaster device 101 or the member receiver device 102 can have multiple processors, where the multiple processors can be physically or electronically coupled together and configured to communicate. The processor 215 can be a central processing unit (CPU).

The broadcaster device 101 can include a key generator 220, a diversifier generator I 225, a diversifier generator II 230, a group ID generator 235, and an encryption engine 240. The member receiver device 102 can include a guest key deriver 245, a session key deriver 250, and decryption engine 255.

The key generator 220 can generate a key, which can be a random number. The key can be a symmetric key that is a 128-bit key and it is also referred to as "the master key" because the master key can be used to other keys. Although a 128-bit key can be used, a longer (e.g., 256 bits) or shorter key length can also be used. The key generator can include symmetric key algorithms such as Data Encryption Standard (DES), Triple DES (3DES), Advanced Encryption Standard (AES), Advanced Encryption Standard-Counter with Cipher Block Chaining-Message Authentication Code (AES-CCM), or another block cipher algorithm. The key generator 220 can also include random number generator or hash functions.

In contrast to generating the key in the broadcaster device, in some implementations, the key generator 220 can simply store or receive the key instead of generating it. For example, a manufacturer of the broadcaster device 101 can store the key in a tamper-resistant memory of the broadcaster device 101 when the manufacturer makes the broadcaster device 101. In some implementations, the broadcaster device 101 can download the master key or input the master key into the memory of the broadcaster device 101. The broadcaster device 101 can distribute the master key without having to generate it.

In other implementations, the broadcaster device can generate different master keys, where each master key can be used by a different group. For example, the broadcaster device can generate a first master key, a second master key, and a third master key and provide each master key to a different receiver device. The broadcaster device can control access to a broadcast or broadcasts based on receiver devices having different master keys.

The diversifier generator I 225 and the diversifier generator II 230 can generate diversifiers. A diversifier can be a prime number, random number, or pseudo random number. The diversifier generator I 225 can generate a first diversifier such as a guest key diversifier and the diversifier generator II 230 can generate a second diversifier such as a session diversifier.

The member receiver device 102 can use the first key diversifier to generate a first key (e.g., generate a guest key from a guest key diversifier and the master key) or use the second key diversifier to generate a second key (e.g., generate a session key from the guest key and the session diversifier). To compute a first diversifier or a second diversifier, the broadcaster device can use the same or different hash functions.

In other implementations, the broadcaster device 101 can generate a single (e.g., only one) diversifier and that single diversifier can be used to generate both a guest key and a session key. In such implementations, the broadcaster device 101 can have a single diversifier generator.

The group ID generator 235 generates a group ID. A group ID can be a 4-bit group ID that can be used with the diversifier to generate a modified diversifier. In some implementations, the modified diversifier can be 128-bits long where the first four bits are the group ID or the modified diversifier can be 132-bits long, where the first four bits are the group ID.

The group ID generator 235 can generate multiple group IDs. The different groups can be associated with access rights. For example, if the group ID is 4-bits long, the group generator can generate 16 different values, where each value is associated with a different group. Group I (0001) can have access to a first broadcast stream whereas group II (0011) can have access to a different broadcast. Table 1 and Table 2 below illustrate an example of a group ID. As shown in Table 1, the session key diversifier is a 128-bit string of characters. As shown in Table 2, the session key identifier is also a 128-bit string of characters, however, the first four bits are the group ID and the diversifier is referred to as a "modified diversifier" because it includes the group ID in the diversifier.

TABLE 1

| Session key diversifier (128 bit) |
| --- |
| 0x0123456789ABCDEF |

TABLE 2

| Session key diversifier with group ID (128 bit) | |
| --- | --- |
| 0x5x123456789ABCDEF | |
| 0x5 | 0x123456789ABCDEF |
| Group ID (4 bit) | Key diversifier (124 bit) |

The encryption engine 240 is used for encrypting data. Based on having a session key, the encryption engine 240 can encrypt data. The encryption engine 240 can use DES, 3DES, AES, AES-CCM, or another block cipher algorithm. For example, the encryption engine 240 can have access to a session key and use the session key to encrypt an audio data stream that the broadcaster device 101 is broadcasting.

The member receiver device 102 can include a guest key deriver 245, a session key deriver 250, and decryption engine 255. The guest key deriver 245 can generate a guest key based on a master key and first diversifier (e.g., a guest key diversifier). The guest key generation operation is generally described as guest key=derive key (master key, guest key diversifier). Like the guest key deriver 245, the session key deriver 250 can generate a session key based on the guest key and a second diversifier (e.g., a session key diversifier). The session key generation operation is generally described as session key=derive key (guest key, session key diversifier). Alternatively, if a single diversifier is used, the guest key diversifier and the session key diversifier can be the same diversifier.

The decryption engine 255 can implement a decryption algorithm based on the session key. For example, the member receiver device 102 can receive an encrypted data stream, where the broadcaster device 101 encrypted the stream with a session key and the member receiver device 102 can decrypt the encrypted data stream. Also, the member receiver device 102 is configured to share its guest key with a guest device. For example, the member receiver device 102 can pair with the guest receiver device 103 and then the member receiver device 102 can securely provide its guest key to the guest device.

In some implementations, the guest key deriver 245 is configured to derive the guest key from a single diversifier that includes group ID and a master key. For example, the guest key deriver 245 can extract the first four bits from a group ID, and save this as its group ID. The member receiver device 102 can also use this group ID information in accordance with instructions, e.g., to only share a guest key with guest devices associated with a group ID.

Figure 2A:
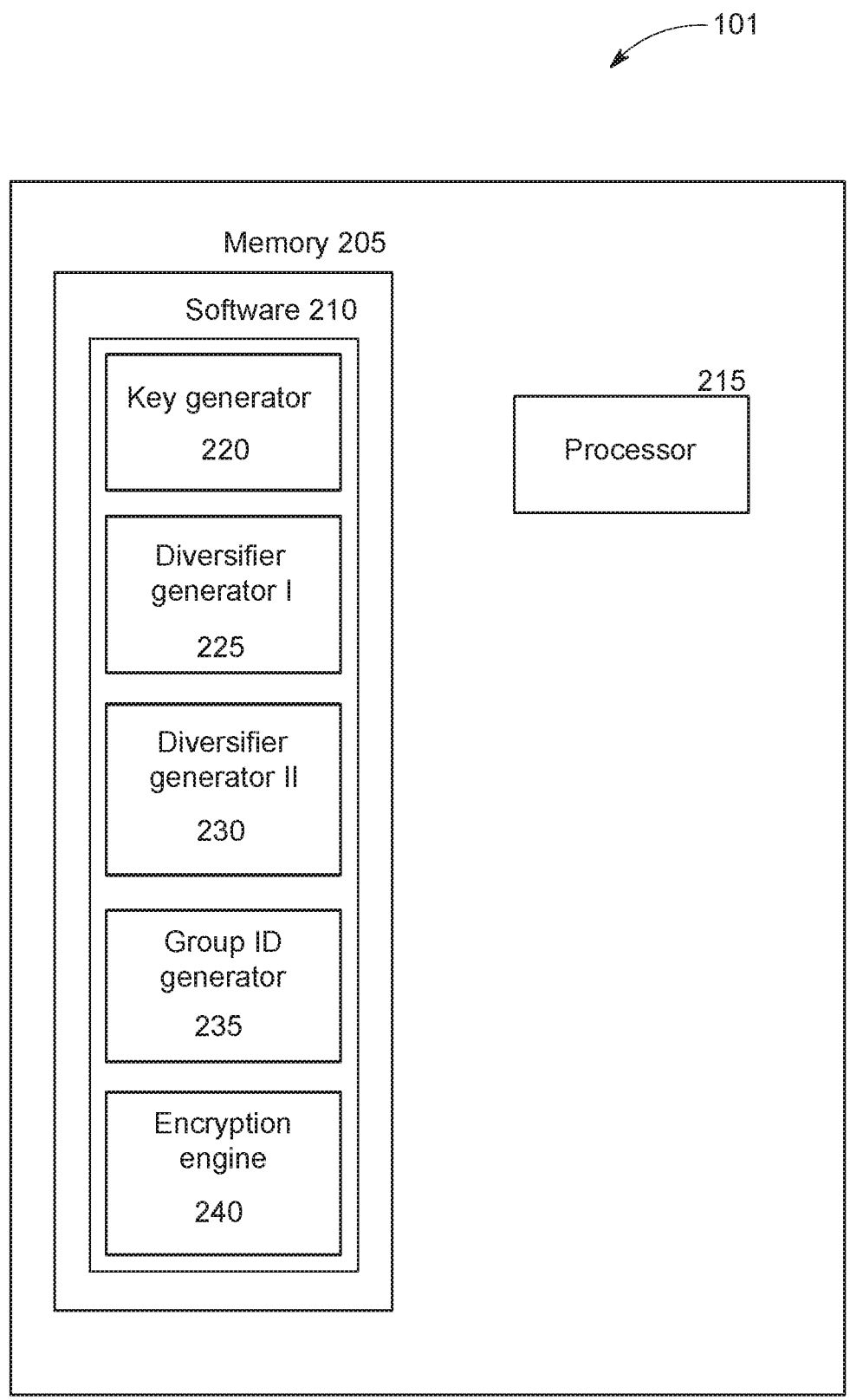
FIGS. 2A and 2B are block diagrams illustrating the broadcaster device and the member receiver device from the wireless communication environment in FIG. 1A in accordance with some implementations of the disclosed technology.
Figure 2B:
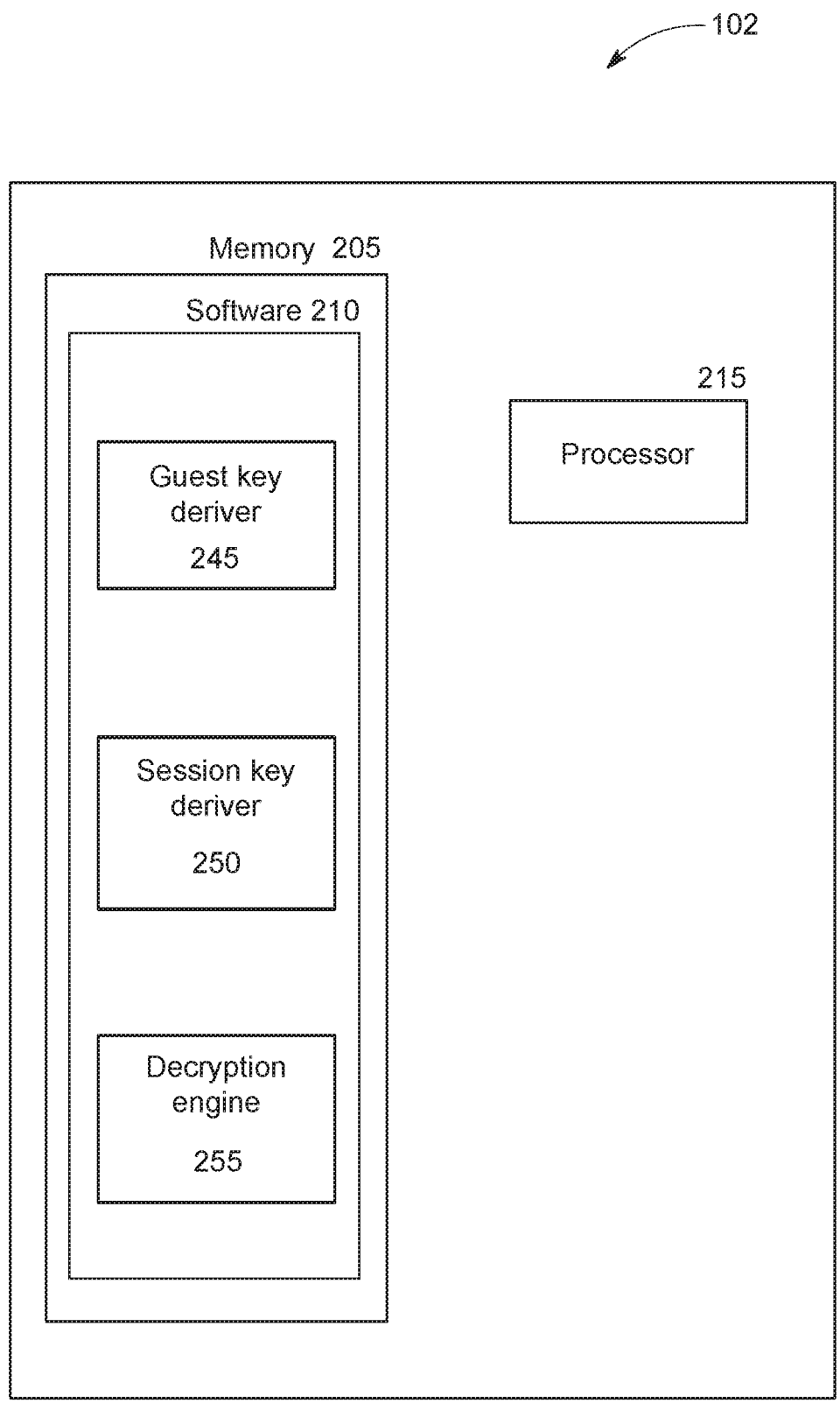

Although the guest receiver device 103 is not shown in FIG. 2B, the guest receiver device 103 can also have the session key deriver 250 and the decryption engine 255. For example, the guest receiver device 103 can receive a guest key from a receiver device or a broadcaster and then use the guest key with a diversifier (e.g., a session diversifier) to generate a key (e.g., a session key), where that key can be used to access an encrypted data stream.

The broadcaster device 101 and the member receiver device 102 can have other components than those shown in FIGS. 2A and 2B. The broadcaster device 101 and the member receiver device 102 can have an antenna, a radio, a microphone, a digital signal processor, or other electronic components or software to perform actions on the devices or communication with another device.

Figure 3A:
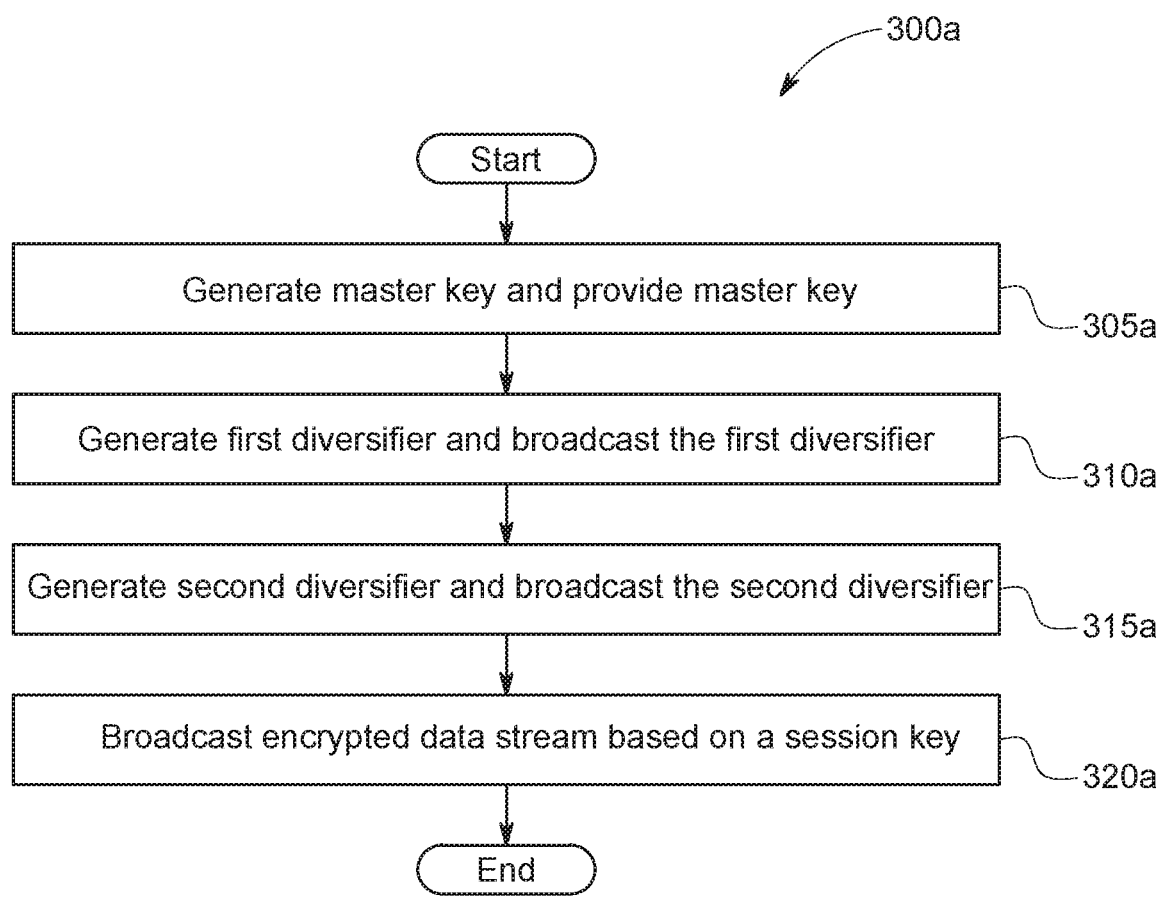
FIGS. 3A, 3B, and 3C are flowcharts for three processes to broadcast an encrypted data stream in accordance with some implementations of the disclosed technology.
Figure 3B:
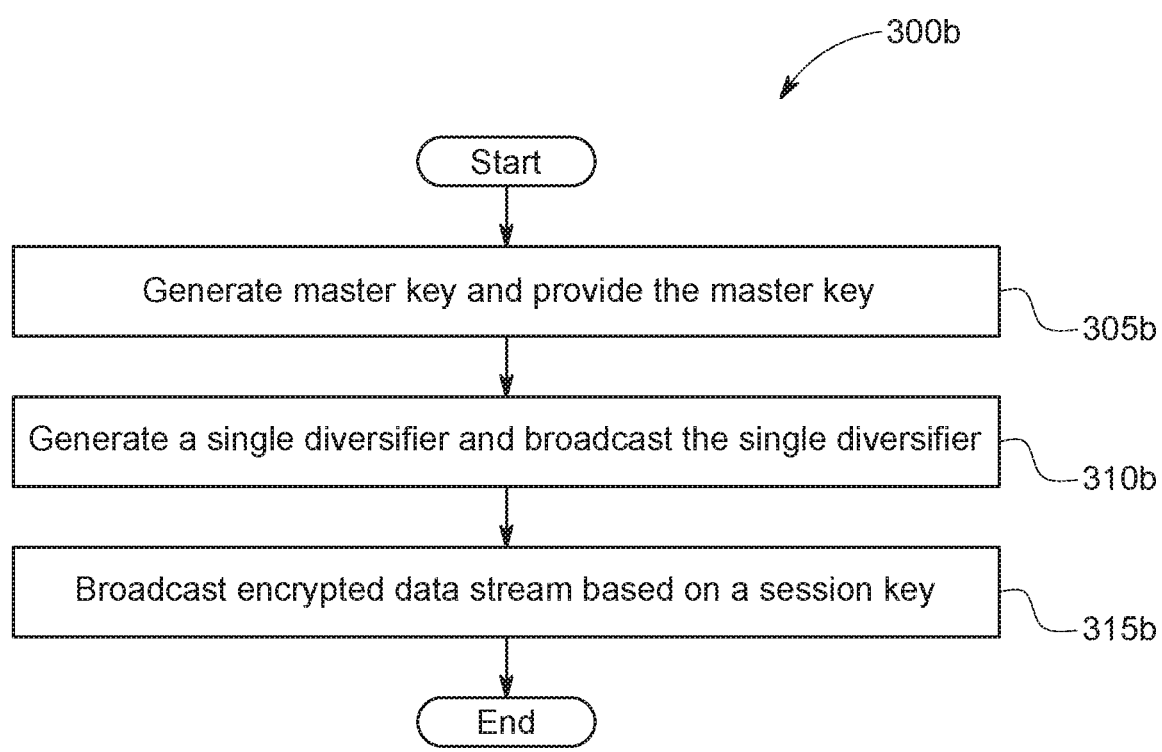
Figure 3C:
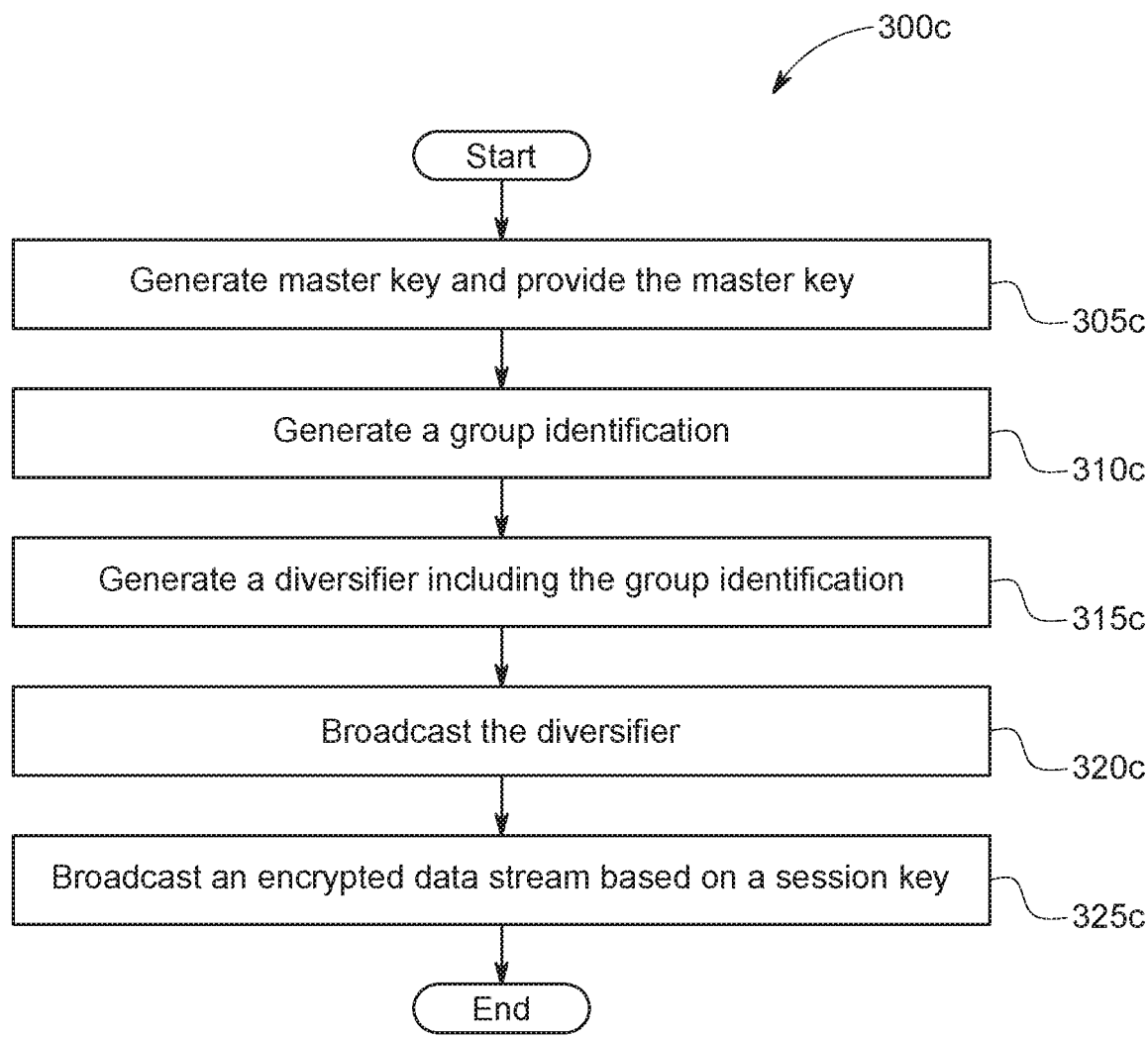

FIGS. 3A, 3B, and 3C are flowcharts for three processes to broadcast encrypted data. FIG. 3A illustrates process 300a that includes broadcasting an encrypted data stream, a first diversifier, and a second diversifier. FIG. 3B illustrates process 300b that includes broadcasting an encrypted data stream and a single diversifier, where the single diversifier can be used for both guest key generation and session key generation. FIG. 3C illustrates process 300c that includes broadcasting an encrypted data stream with a diversifier that includes a group ID. Each of these processes is described below in more detail.

At the key generation and provide operation 305a, the broadcaster device 101 can a master key (e.g., asymmetrical key), which can enable a device to have irrevocable or long-term access to information that requires master key access. The key generation operation can include using algorithms described in FIG. 2A such as AES or DES as well has a hash function or random number generator. Although the broadcaster device 101 can generate the key locally, in some implementations, the broadcaster device 101 may receive the master key during installation operation, receiving the master key from a user, or during manufacturing of the broadcaster device such that the broadcaster device 101 does not need to generate a master key, rather the broadcaster device stores it in memory (e.g., tamper-resistant or secure memory).

After generating the key, the broadcaster device 101 can provide the master key to member receiver devices. The member receiver devices are defined as receiver devices that should have access to the master key. Here, the broadcaster device 101 can determine which receiver devices should have access, e.g., the broadcaster device 101 may only want devices owned by a certain person to have the master key. For example, a user or engineer of the broadcaster device can provide a list of devices to the broadcaster device, where the list includes all devices that should have permanent access to the broadcast. As another example, the broadcaster device can receive requests from receiver devices or guest devices for access and the broadcaster device can grant access based on user confirmation or based on automatic rules (e.g., the broadcaster device can approve devices owned by a certain person or have a certain internet protocol (IP) address). Alternatively, the broadcaster device can communicate with a server, wherein the server is enabled to provide a list of devices that should have access to a master key.

The broadcaster device can provide the master key in several ways. The broadcaster device 101 can provide the master key using an OOB communication (e.g., short message service (SMS) message, an email, or a visual display of the code). Providing the master key can also include providing a piece of paper with the master key, showing the master key on a screen, providing a Quick Response (QR) code or bar code with the master key, or other means of providing the master key. The broadcaster device 101 can also provide the master key using a secure communication, e.g., during or after pairing with a receiver.

At the first diversifier operation 315a, the broadcaster device 101 generates and broadcasts a first diversifier. The broadcaster device 101 can broadcast the first diversifier using an in-band method or an unsecure communication such that the first diversifier is public (e.g., unsecure Wi-Fi™ or broadcast from Bluetooth™). The first diversifier can thus be received by any device capable of using the in-band method or unsecure communication method. The first diversifier can be combined with the master key to generate a guest key. For example, a receiver device can receive the first diversifier and use it generate a guest key based on the master key in its possession. The broadcaster device can broadcast the first diversifier periodically (e.g., every few milliseconds or seconds) or sporadically. The broadcaster device can also repeatedly or frequently broadcast the diversifier so that the receiver device can receive it even if the receiver misses it during a first or second broadcast. Devices that receive the master key are member receiver devices.

At second diversifier operation 315a, the broadcaster device 101 generates and broadcasts a second diversifier. The broadcaster device 101 can broadcast the second diversifier using an in-band method or unsecure communication. The second diversifier can thus be received by any device capable of using the unsecure communication or in-band. In some implementations, the second diversifier is a session key diversifier and can be combined with the guest key to generate a session key. For example, a receiver device can receive the second diversifier and use it to generate a session key based on the guest key in its possession.

At broadcast encrypted data stream operation 320a, the broadcaster device 101 broadcasts the encrypted data stream. The broadcaster can use the session key to encrypt the data stream. The broadcaster can derive the session key from the master key, first diversifier, and second diversifier. For example, the broadcaster can perform the following operations guest key=derive key (master key, guest key diversifier), session key=derive key (guest key, session key diversifier), where derive key is an operation with variables such as master key, guest key diversifier, or session key diversifier. Member receive devices can perform the derive guest key operation and the derive session key operation because these devices possess the master key. In contrast, guest receive devices can only perform the derive session key operation because they don't possess the master key.

After the broadcast encrypted data stream operation 320a, if the broadcaster wants to change access to the encrypted data, the broadcaster can change the first diversifier, which will cause the current guest key to be invalid and thus the session key to be invalid. If the broadcaster device broadcasts a new first diversifier, the member receiver devices can use the new first diversifier to generate a new guest key, and use the new guest key to generate a new session key to decrypt the encrypted stream.

The process 300a is like the process 300b described in FIG. 3B, however, the process 300b broadcasts a single diversifier as compared to a first and second diversifier in the process 300a. The member receiver devices can use the single diversifier to derive both a guest key and the session key. The guest receiver devices can use the single diversifier to derive a session key, assuming the guest devices received the guest key from the broadcaster device or one of the member receiver devices. The process 300b starts with the generate master key and provide master key operation 305b, which is the same as the key generation and transmit operation 305*a* in process 300*a* (described above in FIG. 3A).

The process 300*c* in FIG. 3C is like process 300*b* in FIG. 3B, however, the process 300*c* includes generating a modified diversifier with a group ID (e.g., a modified single diversifier including a group ID). By broadcasting a modified diversifier with a group ID, the members receiver devices can derive a group-specific guest key and the broadcaster can support multiple groups or multiple broadcasts associated with different groups. The group-specific guest key means that the derivation or generation of the group-specific guest key is associated with the group ID. For example, the member group device used a modified diversifier that including the group ID when deriving or generating the group-specific guest key for a group. The process 300*c* begins with the generate master key and transmit master operation 305*c*, which is the same as the corresponding generate master key and transmit master operations 305*a* and 305*b*.

After the generate master key and provide master operation 305*c*, the broadcaster device 101 can perform a generate group ID operation 310*c*. The group ID operation 310*c* can include generating a 4-bit string, which can be concatenated with a diversifier to generate a modifier diversifier. The broadcaster device 101 can determine the grouping of group IDs or devices associated with group IDs (e.g., based on receiving a list groups from the Internet). The group ID can be associated with a group and there can be different group ID for different groups. For example, one group ID may refer to a first set of devices or guests and a second group ID may refer to a second group of guests or devices. Alternatively, the group ID can also refer to a type of broadcast. For example, a first group ID may be associated with a first broadcast related to a first content and a second group ID may be associated with a second broadcast with different content from the content associated with the first group ID.

At operation generate a diversifier including the group ID 315*c*, the broadcaster device can combine the group ID and the diversifier. In some implementations, the broadcaster device appends or concatenates the diversifier to have the group ID to generate a modified diversifier. The group ID can be the first bits of the modified diversifier, in the middle of the modified diversifier, at the end of the modified diversifier, or distributed throughout the modified diversifier.

At broadcast the diversifier operation 320*c*, the broadcaster device can broadcast the modified diversifier. The member receiver devices and the guest receiver devices can receive the modified diversifier. The member receiver devices can use it to generate a group-specific guest key. The broadcaster device or the member receiver devices can share the group-specific guest key with a guest receiver device. The member receiver devices and the guest receiver devices can use the group-specific guest key to generate a session key using the diversifier.

At the broadcast an encrypted data stream based on a session key operation 325*c*, the broadcaster device broadcasts encrypted data based on a session key. The session key is derived from the group-specific guest key and the modified diversifier, and the group-specific guest key is derived from the master key and the modified diversifier (e.g., a single modified diversifier including the group ID). The member receiver devices and the guest receiver devices can derive the session key based on the diversifier and the group-specific key. If the broadcaster device changes the group ID, then the modified diversifier changes and the session key for a group may no longer be valid to decrypt the encrypted data. After the broadcast, the broadcaster device can repeat the all operations of the process 305*c*, some operations, or a single operation. The broadcaster device can also broadcast to different groups simultaneously, where the broadcasts can have the same of different content and the different groups are associated with different group-specific guest keys (or different group IDs).

The processes 300*a*, 300*b*, or 300*c* can be repeated entirely or partially. For example, the broadcaster device 101 can generate a new first, new second diversifier, or a new modified diversifier. The broadcaster device 101 can also generating a second single diversifier, a second guest key, and a second guest key (e.g., when adding a group or changing a broadcast). The processes 300*a*, 300*b*, or 300*c* can also be combined (e.g., performed together or subsequently). The processes 300*a*, 300*b*, or 300*c* can be stored in a computer-readable medium and executed by a processor or broadcaster device (e.g., in the memory 205, FIG. 2A). Accordingly, the processes 300*a*, 300*b*, or 300*c* can be computer-implemented methods. The processes 300*a*, 300*b*, or 300*c* can also be combined.

Figure 4A:
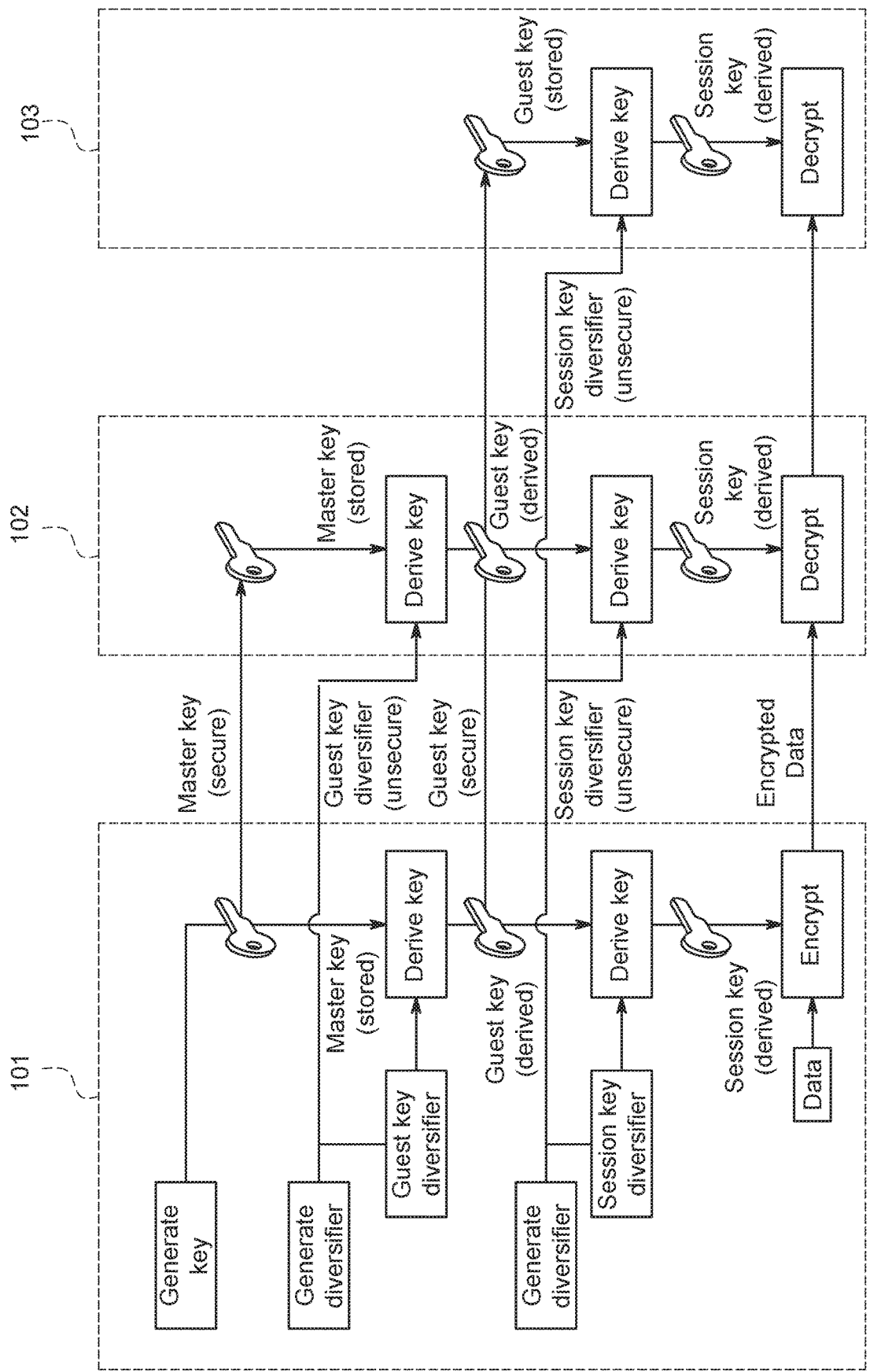
FIGS. 4A, 4B, and 4C are example illustrations of the broadcaster device broadcasting encrypted data in accordance with some implementations of the disclosed technology.
Figure 4B:
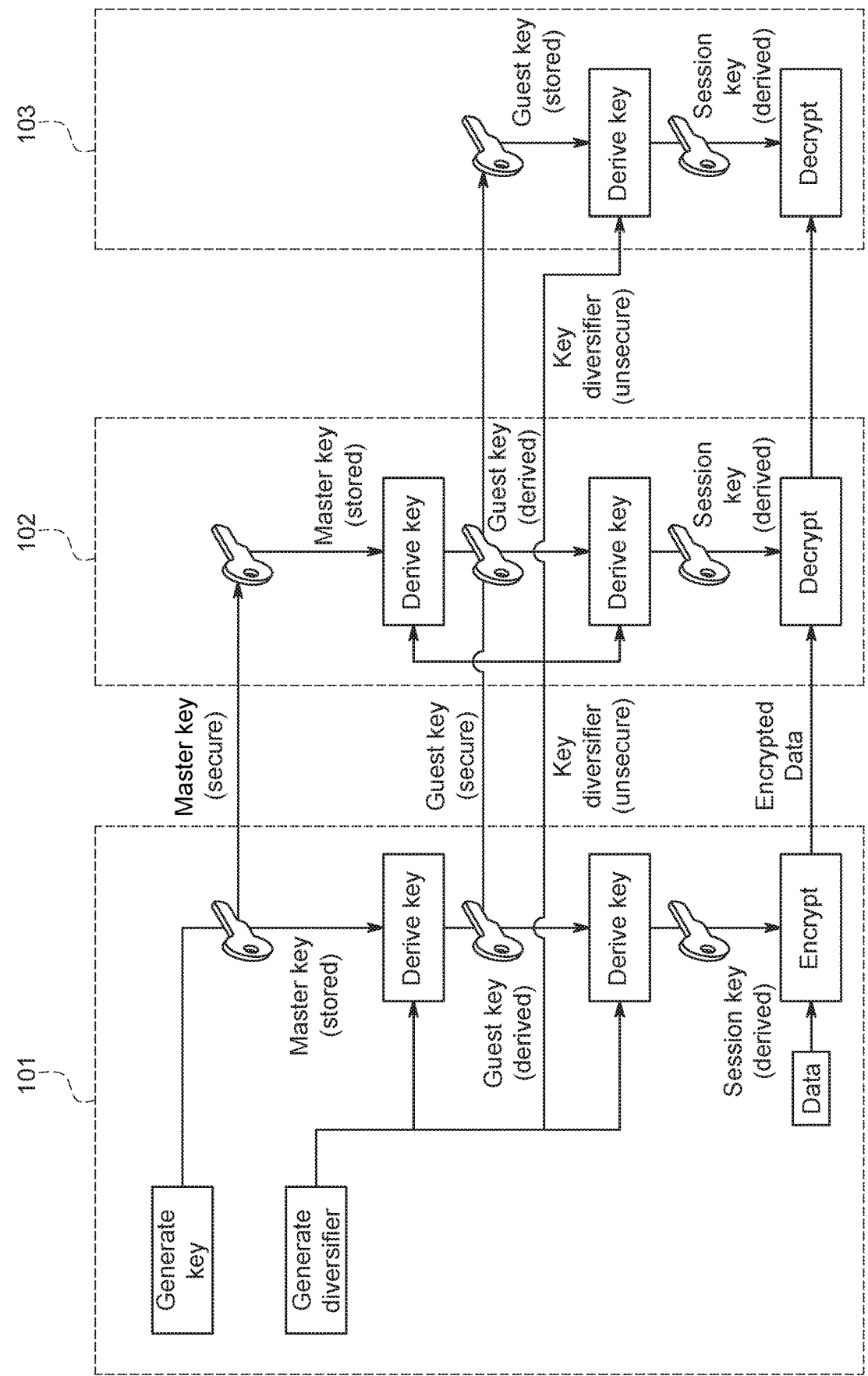
Figure 4C:
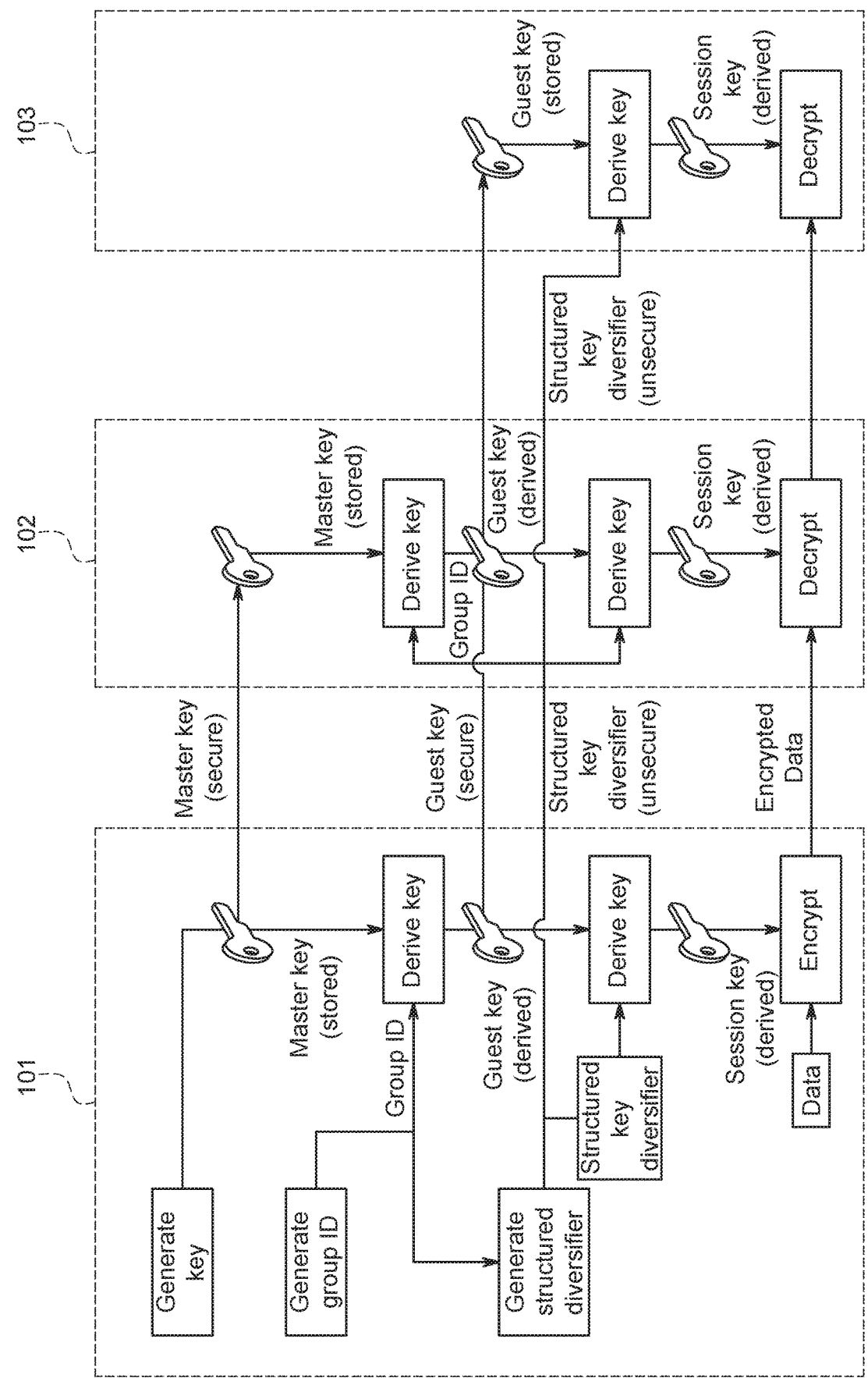

FIGS. 4A, 4B, and 4C are illustrations of examples for broadcasting an encrypted data stream. The FIG. 4A corresponds to the process 300*a* in FIG. 3A; the FIG. 4B corresponds to the process 300*b* in FIG. 3B; and the FIG. 4C corresponds to the process 300*c* in FIG. 3C.

Moving from left to right, the FIGS. 4A-4C include the broadcaster device 101, the member receiver device 102, and the guest receiver device 103. The dashed lines indicate a schematic representation of each device and the solid lines represent operations or connections. For example, the broadcaster device 101 includes a generate key operation and the broadcaster can provide the master key to the member receiver device 102. The broadcaster device 101 can provide the master key using a secure communication (e.g., based on pairing on the devices) or it can provide the master key using an OOB (e.g., Wi-Fi, email, text, or with a paper including the key). The broadcaster device 101 can also generate diversifiers and group IDs as discussed in the processes 300*a*, 300*b*, and 300*c*.

Figure 5:
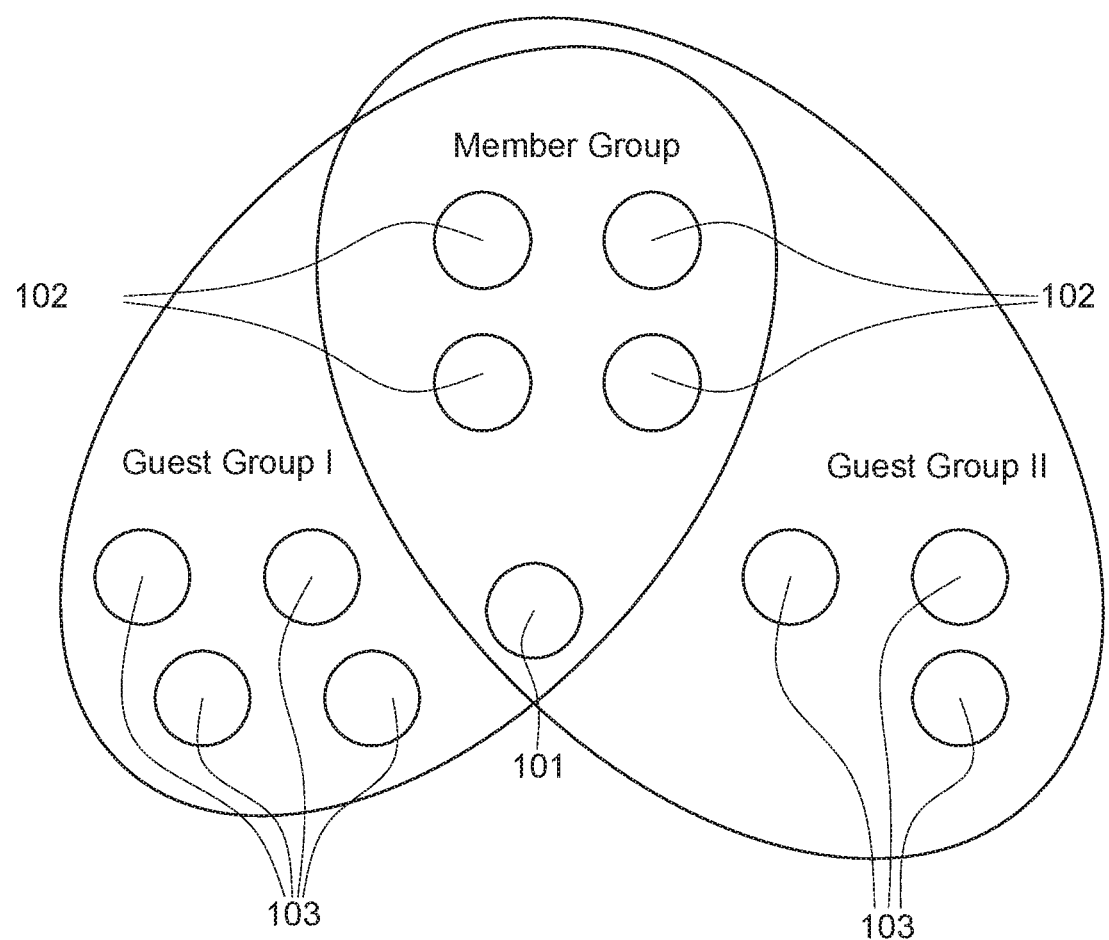
FIG. 5 is a schematic illustration of broadcasting to different groups in accordance with some implementations of the disclosed technology.

FIG. 5 is a schematic illustration of broadcasting for different groups. The center of FIG. 5 has a member group with member receiver devices 102 and the broadcaster device 101, where each device possesses the master key. The left and right side of FIG. 5 have Guest Group I and Guest Group II, where each group has guest receiver devices 103. The guest receiver devices 103 do not have the master key; rather the guest receiver devices 103 receive the guest key from a member group device, which is the broadcaster device 101 or the member receiver devices 102. The broadcaster device 101 can broadcast a diversifier and an encrypted data stream to all devices, e.g., the same stream to member receiver devices, Guest Group I, and Guest Group II.

The broadcaster device 101 can broadcast a stream with a first group ID associated with a first modified diversifier and broadcast another stream with a second group ID associated with a second modified diversifier. The first and second group ID can be associated with different media content or with providing different information to different groups (e.g., Guest Group I and Guest Group II). The broadcaster device 101 can broadcast encrypted data to Guest Group I and Guest Group II simultaneously, where the broadcasts can be the same or different. For example, the content broadcast to guest group I may be different than the content broadcast to guest group II (e.g., different music).

CONCLUSION

The disclosed technology can be applied not only to a system with a single broadcaster device (e.g., to point-to-multipoint-structure), but also to systems having multiple broadcaster devices (e.g., to a multipoint-to-multipoint-structure). In the multiple broadcaster devices implementation, each broadcaster device would generate its own master key and would have its own diversifier (or set of diversifiers in case that there is a plurality of guest groups). Each broadcaster device would have its own address by which it can be identified.

The phrases "in some implementations," "according to some implementations," "in the implementations shown," "in other implementations," and generally mean a feature, structure, or characteristic following the phrase is included in at least one implementation of the disclosure, and may be included in more than one implementation. In addition, such phrases do not necessarily refer to the same embodiments or different implementations.

The techniques introduced here can be embodied as special-purpose hardware (e.g., circuitry), as programmable circuitry appropriately programmed with software or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. In some implementations, the machine-readable medium is non-transitory computer readable medium, where in non-transitory excludes a propagating signal.

The above detailed description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

I claim:

1. A method to broadcast encrypted data, the method comprising:
   providing a master key to a member receiver device,
      wherein the master key enables the member receiver device to generate a guest key;
   generating, at a broadcaster device, a first diversifier;
   broadcasting the first diversifier,
      wherein the member receiver device is configured to derive the guest key from the master key and the first diversifier;
   generating, at the broadcaster device, a second diversifier;
   broadcasting, from the broadcaster device, the second diversifier,
      wherein the member receiver device is configured to derive a session key from the guest key and the second diversifier;
   deriving, at the broadcaster device, the session key based on the guest key and the second diversifier; and
   broadcasting, from the broadcaster device, an encrypted data stream,
      wherein the encrypted data stream is encrypted based on the session key.

2. The method of claim 1, wherein the broadcaster device performs the providing of the master key with a secure communication.

3. The method of claim 2, wherein the secure communication includes the broadcaster device and the member receiver device pairing or pairing previously.

4. The method of claim 1, wherein the method further comprises:
   receiving, at a guest receiver device, the guest key from the broadcaster device or the member receiver device;
   receiving, at the guest receiver device, the second diversifier;
   deriving, at the guest receiver device, the session key from the guest key and the second diversifier; and
   decrypting the encrypted data stream based on the session key.

5. The method of claim 1, wherein the method further comprises:
   receiving, at the member receiver device, the first diversifier;
   deriving, at the member receiver device, the guest key based on the master key and the first diversifier;
   receiving, at the member receiver device, the second diversifier;
   deriving, at the member receiver device, the session key based on the guest key and the second diversifier; and
   decrypting, at the member receiver device, the encrypted data stream based on the session key.

6. The method of claim 1, wherein the method further comprises: repeating the broadcast of the first or second diversifiers.

7. A non-transitory computer-readable medium storing instructions that when executed by a processor cause a device or devices to perform a method to broadcast encrypted data, the method comprising:
   providing a master key to a member receiver device,
      wherein the master key enables the member receiver device to generate a guest key;

generating, at a broadcaster device, a first diversifier;
broadcasting the first diversifier,
   wherein the member receiver device is configured to derive the guest key from the master key and the first diversifier;
generating, at the broadcaster device, a second diversifier;
broadcasting, from the broadcaster device, the second diversifier,
   wherein the member receiver device is configured to derive a session key from the guest key and the second diversifier;
deriving, at the broadcaster device, the session key based on the guest key and the second diversifier; and
broadcasting, from the broadcaster device, an encrypted data stream,
   wherein the encrypted data stream is encrypted based on the session key.

8. The non-transitory computer-readable medium of claim 7, wherein the broadcaster device performs the providing of the master key with a secure communication.

9. The non-transitory computer-readable medium of claim 8, wherein the secure communication includes the broadcaster device and the member receiver device pairing or pairing previously.

10. The non-transitory computer-readable medium of claim 7, wherein the method further comprises:
   receiving, at a guest receiver device, the guest key from the broadcaster device or the member receiver device;
   receiving, at the guest receiver device, the second diversifier;
   deriving, at the guest receiver device, the session key from the guest key and the second diversifier; and
   decrypting the encrypted data stream based on the session key.

11. The non-transitory computer-readable medium of claim 7, wherein the method further comprises:
   receiving, at the member receiver device, the first diversifier;
   deriving, at the member receiver device, the guest key based on the master key and the first diversifier;
   receiving, at the member receiver device, the second diversifier;
   deriving, at the member receiver device, the session key based on the guest key and the second diversifier; and
   decrypting, at the member receiver device, the encrypted data stream based on the session key.

12. The non-transitory computer-readable medium of claim 7, wherein the method further comprises: repeating the broadcast of the first or second diversifiers.

13. A system for communicating, the system comprising:
a member receiver device;
a broadcaster device configured to provide a master key to the member receiver device, configured to generate a first diversifier, and configured to generate a second diversifier,
   wherein the master key enables the member receiver device to generate a guest key,
   wherein the member receiver device is configured to derive the guest key from the master key and the first diversifier,
   wherein the member receiver device is configured to derive a session key from the guest key and the second diversifier,
   wherein the broadcaster device is configured to generate the session key based on the guest key and the second diversifier, and
   wherein the broadcaster device is configured to broadcast an encrypted data stream based on the session key.

14. The system of claim 13, wherein the broadcaster device is configured to provide of the master key with a secure communication.

15. The system of claim 14, wherein the secure communication includes the broadcaster device and the member receiver device pairing or pairing previously.

16. The system of claim 13, wherein the system further comprises:
   a guest receiver device configured to:
      receive the guest key from the broadcaster device or the member receiver device,
      receive the second diversifier,
      receive the second diversifier,
      derive the session key from the guest key and the second diversifier, and
      decrypt the encrypted data stream based on the session key.

17. The system of claim 13, wherein the member device is further configured to:
   receive the first diversifier,
   derive the guest key based on the master key and the first diversifier,
   receive the second diversifier,
   derive the session key based on the guest key and the second diversifier, and
   decrypt the encrypted data stream based on the session key.

* * * * *